(12) United States Patent
Xu et al.

(10) Patent No.: US 9,780,935 B2
(45) Date of Patent: Oct. 3, 2017

(54) METHOD AND DEVICE FOR TRANSMITTING DOWNLINK PILOT

(75) Inventors: Jing Xu, Beijing (CN); Deshan Miao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 484 days.

(21) Appl. No.: 13/521,659

(22) PCT Filed: Jan. 11, 2011

(86) PCT No.: PCT/CN2011/070149
§ 371 (c)(1),
(2), (4) Date: Jul. 11, 2012

(87) PCT Pub. No.: WO2011/082697
PCT Pub. Date: Jul. 14, 2011

(65) Prior Publication Data
US 2013/0016674 A1 Jan. 17, 2013

(30) Foreign Application Priority Data
Jan. 11, 2010 (CN) .......................... 2010 1 0002542

(51) Int. Cl.
*H04L 25/03* (2006.01)
*H04L 5/00* (2006.01)
(Continued)

(52) U.S. Cl.
CPC ........... *H04L 5/0051* (2013.01); *H04B 7/068* (2013.01); *H04B 7/0684* (2013.01);
(Continued)

(58) Field of Classification Search
None
See application file for complete search history.

(56) References Cited

U.S. PATENT DOCUMENTS 8,493,924 B2 * 7/2013 Kwon et al. .................. 370/329
8,520,501 B2 * 8/2013 Han ........................ H04J 13/10
370/203

(Continued)

FOREIGN PATENT DOCUMENTS

| CN | 101409583 A | 4/2009 |
|---|---|---|
| CN | 10143190 A | 5/2009 |
| CN | 101467375 A | 6/2009 |

OTHER PUBLICATIONS

Supplementary European Search Report issued for EP counterpart application.

(Continued)

*Primary Examiner* — Huy D Vu
*Assistant Examiner* — Bao G Nguyen
(74) *Attorney, Agent, or Firm* — Kilpatrick Townsend & Stockton LLP

(57) ABSTRACT

Disclosed is a method for transmitting a downlink pilot, which serves to solve the problem that the power of Orthogonal Frequency Division Multiplexing (OFDM) symbols is different due to Walsh codes. The method includes: transmitting a dedicated pilot in the Code Division Multiplexing (CDM) approach or in the combination approach of CDM and Frequency Division Multiplexing (FDM); further, in the resources for transmitting the dedicated pilot, configuring an orthogonal resources for the dedicated pilot according to a set mapping rule.

14 Claims, 6 Drawing Sheets

(51) Int. Cl.
H04J 13/00 (2011.01)
H04B 7/06 (2006.01)
H04L 27/26 (2006.01)
H04J 13/18 (2011.01)
H04J 13/16 (2011.01)

(52) U.S. Cl.
CPC ............ *H04J 13/004* (2013.01); *H04J 13/18* (2013.01); *H04L 27/2613* (2013.01); *H04B 2201/70701* (2013.01); *H04J 13/0074* (2013.01); *H04J 2013/165* (2013.01); *H04L 5/0007* (2013.01); *H04L 5/0016* (2013.01); *H04L 5/0023* (2013.01); *H04L 2025/03426* (2013.01)

(56) References Cited

U.S. PATENT DOCUMENTS

| | | | | |
|---|---|---|---|---|
| 8,705,507 | B2* | 4/2014 | Hoshino | H04B 7/0671 370/342 |
| 2008/0192718 | A1* | 8/2008 | Jongren | H04B 7/0617 370/342 |
| 2008/0279170 | A1* | 11/2008 | Malladi et al. | 370/343 |
| 2009/0168730 | A1* | 7/2009 | Baum et al. | 370/336 |
| 2010/0254341 | A1* | 10/2010 | Sun | H04L 5/0007 370/330 |
| 2011/0085495 | A1* | 4/2011 | Ko et al. | 370/328 |
| 2011/0199889 | A1* | 8/2011 | Han et al. | 370/210 |
| 2012/0188988 | A1* | 7/2012 | Chung | H04J 13/00 370/335 |
| 2013/0235839 | A1* | 9/2013 | Kim | H04L 5/0092 370/329 |

OTHER PUBLICATIONS

Ericsson et al: "On Rel-10 DM RS design for rank 5-8", 3GPP Draft; R1-094438 on Rel-10 DM RS Design for Rank 5-8, 3rd Generation Partnership Project (3GPP), Mobile Competence Centre ; 650, Route Des Lucioles ; F-06921 Sophia-Antipolis Cedex; France, No. Jeju; Nov. 9, 2009, Nov. 9, 2009 (Nov. 9, 2009), XP050388866, [retrieved on Nov. 3, 2009] * Sect. s 2-3 *.

Panasonic: "Joint consideration of DL DM-RS design and codeword-layer mapping for rank over 3", 3GPP Draft; R1-094587, 3rd Generation Partnership Project (3GPP), Mobile Competence Centre ; 650, Route Des Lucioles ; F-06921 Sophia-Antipolis Cedex; France, No. Jeju; Nov. 9, 2009, Nov. 9, 2009 (Nov. 9, 2009) , XP050388927, [retrieved on Nov. 2, 2009] * Sect. s 2-3 *.

Research in Motion et al: "Downlink DM-RS Design Considerations for Rank 5-8 in LTE-A", 3GPP Draft; R1-094454 (RIM-DL DM-RS Rank 5-8), 3rd Generation Partnership Project (3GPP), Mobile Competence Centre; 650, Route Des Lucioles ; F-06921 Sophia-Antipolis Cedex; France, No. Jeju; Nov. 9, 2009, Nov. 9, 2009 (Nov. 9, 2009) , XP050388880, [retrieved on Nov. 3, 2009] * Sect. s 2, 3 *.

3GPP TSG-RAN WG1 #57, May 4-8, 2009, San Francisco, USA, 12 pages.

NTT Docomo et al: "UL RS Enhancement for LTE-Advanced", 3GPP Draft; R1-094911 UL RS, 3rd Generation Partnership Project (3GPP), Mobile Competence Centre ; 650, Route Des Lucioles; F-06921 Sophia-Antipolis Cedex; France, No. Jeju; Nov. 2009.

ZTE: "Investigation for DMRS of rank 5-8", 3GPP Draft; R1-094751 Investigation for DMRS of Rank 5-8, 3rd Generation Partnership Project (3GPP), Mobile Competence Centre; 650, Route Des Lucioles ; F-06921 Sophia-Antipolis Cedex; France, No. Jeju; Nov. 9, 2009.

Office Action received in the European counterpart application EP11731698.4, issued Feb. 17, 2015, 6 pages.

* cited by examiner

METHOD AND DEVICE FOR TRANSMITTING DOWNLINK PILOT

The present application is a US National Stage of International Application No. PCT/CN2011/070149, filed 11 Jan. 2011, designating the United States, and claiming priority to Chinese Patent Application No. 201010002542.4 filed 11 Jan. 2010.

FIELD OF THE INVENTION

The present invention relates to the field of communications and particularly to a method and device for transmitting a downlink pilot.

BACKGROUND OF THE INVENTION

In a 3GPP LTE-Advanced system (LTE stands for Long Term Evolution which is an evolved system of a third-generation mobile communication system, and an LTE-Advanced system is an upgraded LTE system), new technologies such as high-order MIMO, Coordinated Multi-Point transmission technology will be adopted to improve the performance of the system.

In view of these new technical features, the LTE-A system adopts a dedicated pilot to demodulate data, and pilots are kept orthogonal between respective streams. For a transmission scheme with the number of streams being 1 and 2, pilots of two streams are orthogonal in a CDM mode; for a transmission scheme with the number of streams being 3 and 4, pilots of four streams are in a hybrid FDM and CDM mode; and for a transmission scheme with the number of streams being 5, 6, 7 and 8, pilots of eight streams are in the hybrid FDM and CDM mode. As can be seen, the CDM orthogonal mode is involved for pilots in all the transmission schemes. However a Walsh code or a normalized Walsh code is adopted as a pilot in the CDM mode, thus resulting in different power over two adjacent OFDM symbols where the pilot is located.

SUMMARY OF THE INVENTION

Embodiments of the invention provide a method and device for transmitting a downlink pilot so as to address the problem in the prior art of different powers over OFDM symbols.

An embodiment of the invention provides a method for transmitting a downlink pilot, which includes: configuring a dedicated pilot with an orthogonal sequence over a resource for transmission of the dedicated pilot according to a preset mapping rule; and transmitting the dedicated pilot in a Code Division Multiplexing, CDM, mode or in a hybrid CDM and Frequency Division Multiplexing, FDM, mode.

An embodiment of the invention provides a device for transmitting a downlink pilot, which includes:

a configuring unit configured to configure a dedicated pilot with an orthogonal sequence over a resource for transmission of the dedicated pilot according to a preset mapping rule; and a transmitting unit configured to transmit the dedicated pilot processed by the configuring unit in a Code Division Multiplexing, CDM, mode or in a hybrid CDM and Frequency Division Multiplexing, FDM, mode.

In the embodiments of the invention, a dedicated pilot is transmitted in a Code Division Multiplexing (CDM) mode or in a hybrid CDM and Frequency Division Multiplexing (FDM) mode, where the dedicated pilot is configured with an orthogonal sequence over a resource for transmission of the dedicated pilot according to a preset mapping rule to thereby address the problem of different power of OFDM symbols due to a Walsh code.

DETAILED DESCRIPTION OF THE EMBODIMENTS

In embodiments of the invention, a dedicated pilot is transmitted in a Code Division Multiplexing (CDM) mode or in a hybrid CDM and Frequency Division Multiplexing (FDM) mode, where the dedicated pilot is configured with an orthogonal sequence over a resource for transmission of the dedicated pilot according to a preset mapping rule.

Figure 1:
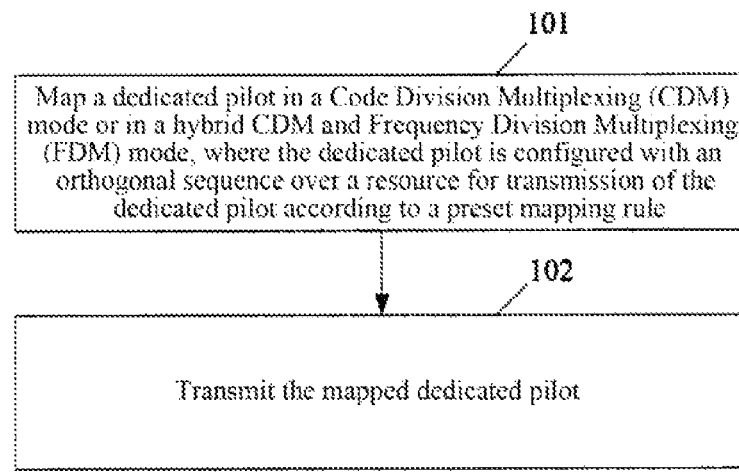
FIG. 1 is a schematic flow chart of a method for transmitting a downlink pilot according to an embodiment of the invention.

Referring to FIG. 1, a method for transmitting a dedicated pilot according to an embodiment of the invention includes the following steps:

Step 101: A dedicated pilot is mapped in a Code Division Multiplexing (CDM) mode or in a hybrid CDM and Frequency Division Multiplexing (FDM) mode, where the dedicated pilot is configured with an orthogonal sequence over a resource for transmission of the dedicated pilot according to a preset mapping rule, and furthermore the dedicated pilot can further be mapped to a port according to the preset mapping rule before it is configured with the orthogonal sequence.

Step 102: The mapped dedicated pilot is transmitted.

For a system at a transmission rank of 3 to 8, an orthogonal sequence and a mapping rule adopted for a first stream to be transmitted are the same as those at a transmission rank of 1 or 2, and an orthogonal sequence and a mapping rule adopted for a second stream to be transmitted are the same as those at a transmission rank of 2. For a system at a transmission rank of 5 to 8, an orthogonal sequence and a mapping rule adopted for a third stream to be transmitted are the same as those at a transmission rank of 3 or 4, and an orthogonal sequence and a mapping rule adopted for a fourth stream to be transmitted are the same as those at a transmission rank of 4.

The same set of orthogonal sequences is adopted for groups of ports mapped into different resources; or groups of ports mapped into different resources are configured respectively with different sets of orthogonal sequences.

In a recommended design, the groups of ports mapped into different resources are configured respectively with the sets of orthogonal sequences between which a cyclic shift relationship is satisfied. Preferably the value of a cyclic shift is 2.

Different orthogonal sequences in the same set of orthogonal sequences are adopted for ports mapped onto the same sub-carrier.

Adjacent sub-carriers, corresponding to the same port, for transmission of a dedicated pilot have their orthogonal sequences selected from different sets of orthogonal sequences. In a recommended design, orthogonal sequences of adjacent sub-carriers, corresponding to the same port, for transmission of a dedicated pilot are arranged in a reverse order to each other.

For a system at a transmission rank of 1 to 4, two adjacent sub-carriers, corresponding to the same port, for transmission of a dedicated pilot have their orthogonal sequences selected from different sets of orthogonal sequences.

For a system at a transmission rank of 5 to 8, two adjacent sub-carriers, corresponding to the same port, for transmission of a dedicated pilot have their orthogonal sequences selected from different sets of orthogonal sequences.

For a system at a transmission rank of 5 to 8, four adjacent sub-carriers, corresponding to the same port, for transmission of a dedicated pilot have their orthogonal sequences selected from different sets of orthogonal sequences.

For a system at a transmission rank of 1 to 4, two adjacent sub-carriers, corresponding to the same port, for transmission of a dedicated pilot have their orthogonal sequences selected from different sets of orthogonal sequences in a frequency order within a system bandwidth.

For a system at a transmission rank of 5 to 8, two adjacent sub-carriers, corresponding to the same port, for transmission of a dedicated pilot have their orthogonal sequences selected from different sets of orthogonal sequences in a frequency order within a system For a system at a transmission rank of 5 to 8, four adjacent sub-carriers. corresponding to the same port, for transmission of a dedicated pilot have their orthogonal sequences selected from different sets of orthogonal sequences in a frequency order within a system bandwidth.

The number of sets of orthogonal sequences is consistent with the code length of an orthogonal code used for the dedicated pilot.

A cyclic shift relationship is satisfied between the sets of orthogonal sequences.

Figure 2:
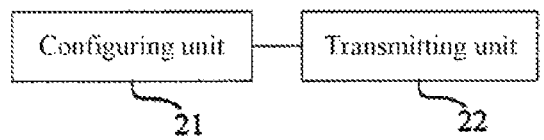
FIG. 2 is a schematic structural diagram of a device for transmitting a downlink pilot according to an embodiment of the invention.

Referring to FIG. 2, a device for transmitting a downlink pilot according to an embodiment of the invention includes a configuring unit 21 and a transmitting unit 22, where:

The configuring unit 21 is configured to configure a dedicated pilot with an orthogonal sequence over a resource for transmission of the dedicated pilot according to a preset mapping rule, and furthermore the configuring unit 21 can further map the dedicated pilot to a port according to the preset mapping rule before the dedicated pilot is configured with the orthogonal sequence.

The transmitting unit 22 is configured to transmit the dedicated pilot in a Code Division Multiplexing (CDM) mode or in a hybrid CDM and Frequency Division Multiplexing (FDM) mode.

For a system at a transmission rank of 3 to 8, an orthogonal sequence and a mapping rule adopted for a first stream are the same as those at a transmission rank of 1 or 2, and an orthogonal sequence and a mapping rule adopted for a second stream are the same as those at a transmission rank of 2.

For a system at a transmission rank of 5 to 8, an orthogonal sequence and a mapping rule adopted for a third stream are the same as those at a transmission rank of 3 or 4, and an orthogonal sequence and a mapping rule adopted for a transmitted stream are the same as those at a transmission rank of 4.

The same set of orthogonal sequences is adopted for groups of ports mapped into different resources; or groups of ports mapped into different resources are configured respectively with different sets of orthogonal sequences.

In a recommended design, groups of ports mapped into different resources are configured respectively with different sets of orthogonal sequences between which a cyclic shift relationship is satisfied. Preferably the value of a cyclic shill is 2.

Different orthogonal sequences in the same set of orthogonal sequences are adopted for ports mapped onto the same sub-carrier.

Adjacent sub-carriers, corresponding to the same port, for transmission of a dedicated pilot have their orthogonal sequences selected from different sets of orthogonal sequences. In a recommended design, orthogonal sequences of adjacent sub-carriers, corresponding to the same port, for transmission of a dedicated pilot are arranged in a reverse order to each other.

For a system at a transmission rank of 1 to 4, two adjacent sub-carriers, corresponding to the same port, for transmission of a dedicated pilot have their orthogonal sequences selected from different sets of orthogonal sequences; for a system at a transmission rank of 5 to 8, two adjacent sub-carriers, corresponding to the same port, for transmission of a dedicated pilot have their orthogonal sequences selected from different sets of orthogonal sequences; or for a system at a transmission rank of 5 to 8, four adjacent sub-carriers, corresponding to the same port, for transmission of a dedicated pilot have their orthogonal sequences selected from different sets of orthogonal sequences.

For a system at a transmission rank of 1 to 4, two adjacent sub-carriers, corresponding to the same port, for transmission of a dedicated pilot have their orthogonal sequences selected from different sets of orthogonal sequences in a frequency order within a system bandwidth.

For a system at a transmission rank of 5 to 8, two adjacent sub-carriers, corresponding to the same port, for transmission of a dedicated pilot have their orthogonal sequences selected from different sets of orthogonal sequences in a frequency order within a system bandwidth.

For a system at a transmission rank of 5 to 8, four adjacent sub-carriers, corresponding to the same port, for transmission of a dedicated pilot have their orthogonal sequences selected from different sets of orthogonal sequences in a frequency order within a system bandwidth.

The number of sets of orthogonal sequences is consistent with the code length of an orthogonal code used for the dedicated pilot.

A cyclic drift relationship is satisfied between the sets of orthogonal sequences.

A specific implementation solution at the rank3-rank4 will be detailed below particular embodiments.

Figure 3:
FIG. 3 illustrates a schematic structural diagram of LTE-A downlink dedicated pilots.

FIG. 3 illustrates a structure of LTE-A downlink dedicated pilots. Referring to FIG. 3, the structure of pilots at the rank3-rank4 is based upon that at the rank 1-rank2 but includes an increased number of support ports, and as illustrated in FIG. 3, 01 corresponds to first and second streams, and 23 corresponds to third and fourth streams; and 01 and 23 are distinguished from the same other in a frequency division (FDM) mode, the first and second streams are distinguished from each other in a CDM mode, and the third and fourth streams are distinguished from each other in the CDM mode.

In view of the structural characteristic of the dedicated pilots at the rank3-rank4, a set of orthogonal sequences is inverted (selected) particularly in two modes: sub-carrier based and sub-carrier group based.

Figure 4:
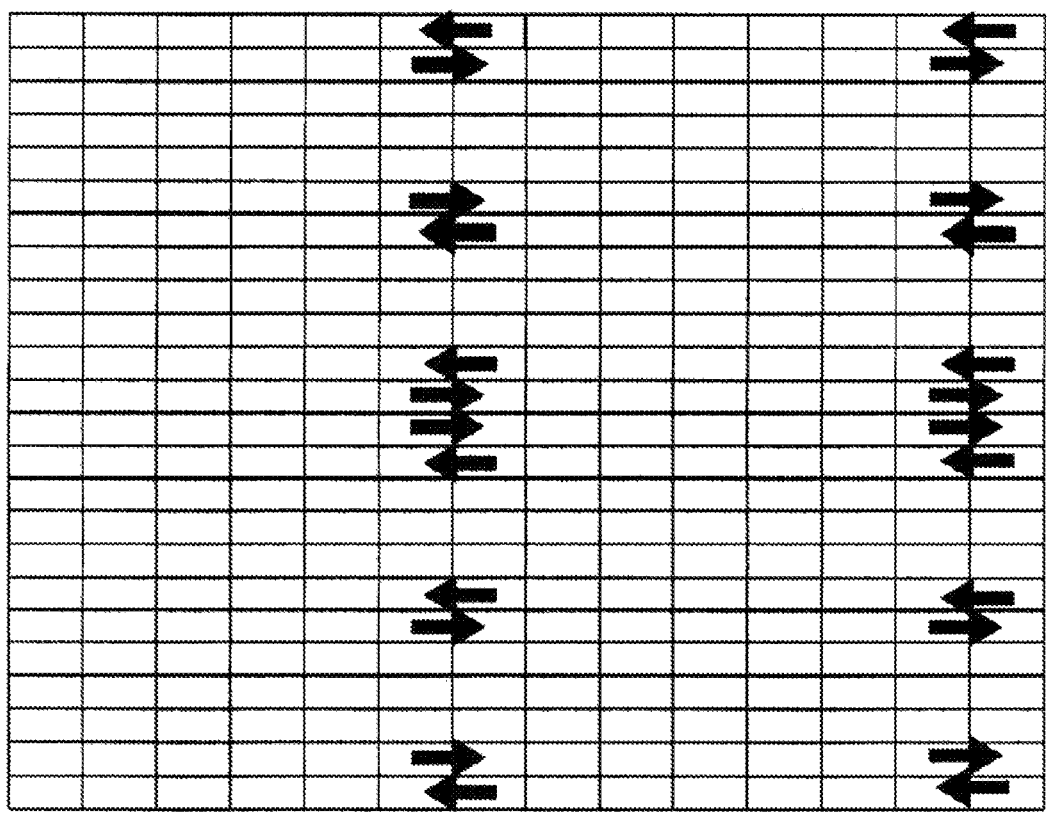
FIG. 4 is a schematic diagram of a sub-carrier based sequence mapping scheme at the rank 3-rank 4 according to an embodiment of the invention.

FIG. 4 is a schematic diagram of an embodiment of sub-carrier based configuration of orthogonal sequences at the rank3-rank4. Referring to FIG. 4, there are different sets of orthogonal sequences for adjacent sub-carriers in this embodiment.

An orthogonal sequence a left-directed arrow ⇐ is Code index0: [1 1] [1 −1]; and An orthogonal sequence with a right-directed arrow ⇒ is Code index0: [1 1] [−1 1].

Figure 5:
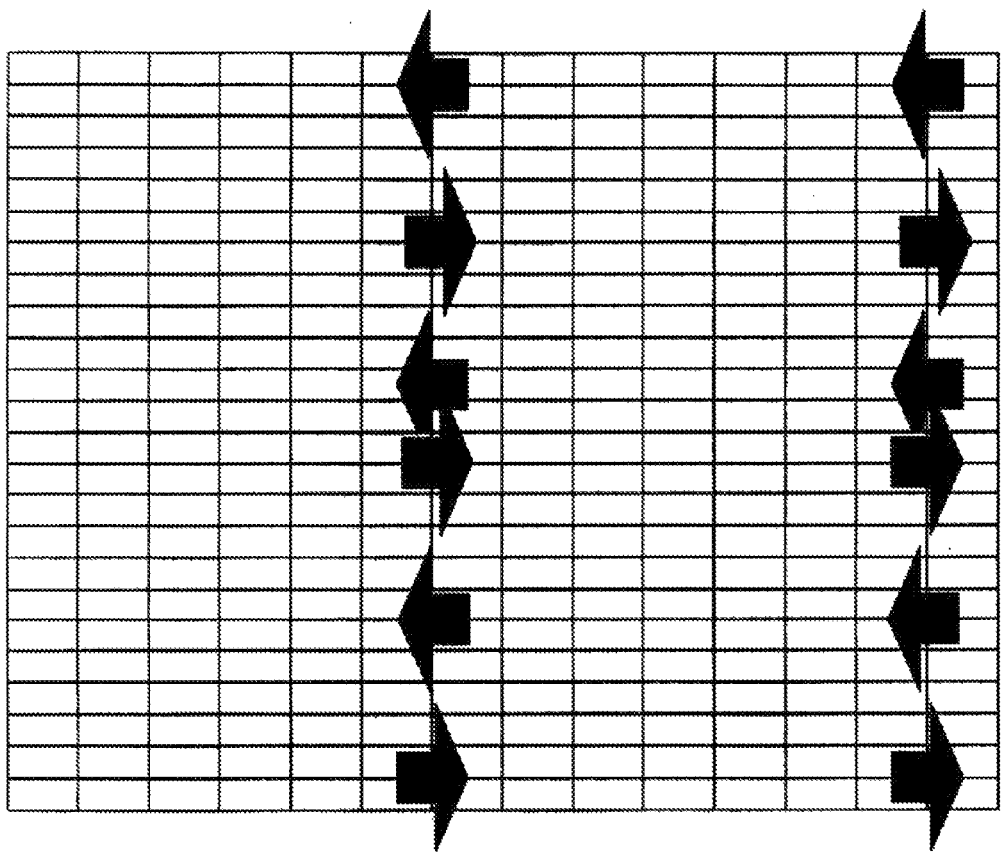
FIG. 5 is a schematic diagram of a sub-carrier group based sequence mapping scheme at the rank 3-rank 4 according to an embodiment of the invention.

FIG. 5 is a schematic diagram of another embodiment of sub-carrier group based configuration of orthogonal sequences at the rank3-rank4. Referring to FIG. 5, in this embodiment, firstly adjacent sub-carriers in a PRB are grouped into three groups in the PRB with two corresponding sub-carriers in a group; and a sequence is inverted (selected) per sub-carrier group, that is, the same set of orthogonal sequences is adopted for sub-carriers in a group, and different sets of orthogonal sequences are adopted for adjacent groups.

An orthogonal sequence with a left-directed arrow ⇐ is Code index0: [1 1] [1 −1]; and An orthogonal sequence with right-directed arrow ⇒ is Code index0: [1 1] [−1 1].

A specific implementation solution at the rank5-rank8 will be detailed below in particular embodiments.

Referring to FIG. 3, in a port mapping scheme, 01 and 23 correspond to four streams respectively and are distinguished from each other in an FDM mode; and the four streams to which 01 correspond are distinguished from each other a CDM mode, and the four streams to which 23 correspond are distinguished from each other the CDM mode. For backward compatibility, such a scheme can preferably be adopted that 01 corresponds to first, second, fifth and seventh streams, 23 corresponds to third, fourth, sixth and eighth streams, and 01 and 23 are distinguished from each other in a Frequency Division (FDM) mode. The first, second, fifth and seventh streams are distinguished from each other in a CDM mode, and the third, fourth, sixth and eighth streams are distinguished from each other in the CDM mode. This scheme is consistent and thus compatible with the scenario at the rank3-4 where 01 corresponds to the first and second streams and 23 corresponds to the third and fourth streams.

A scheme in the scenario at the rank5-rank8 is the same as that at the rank3-rank4 with the length of an orthogonal sequence being 2 except for different ports to which respective sequences correspond, and a repeated description thereof will be omitted here.

Four sets of orthogonal sequences are adopted and mapped according to a predetermined rule in the scenario at the rank5-rank8 with the length of an orthogonal sequence being 4.

Figure 6:
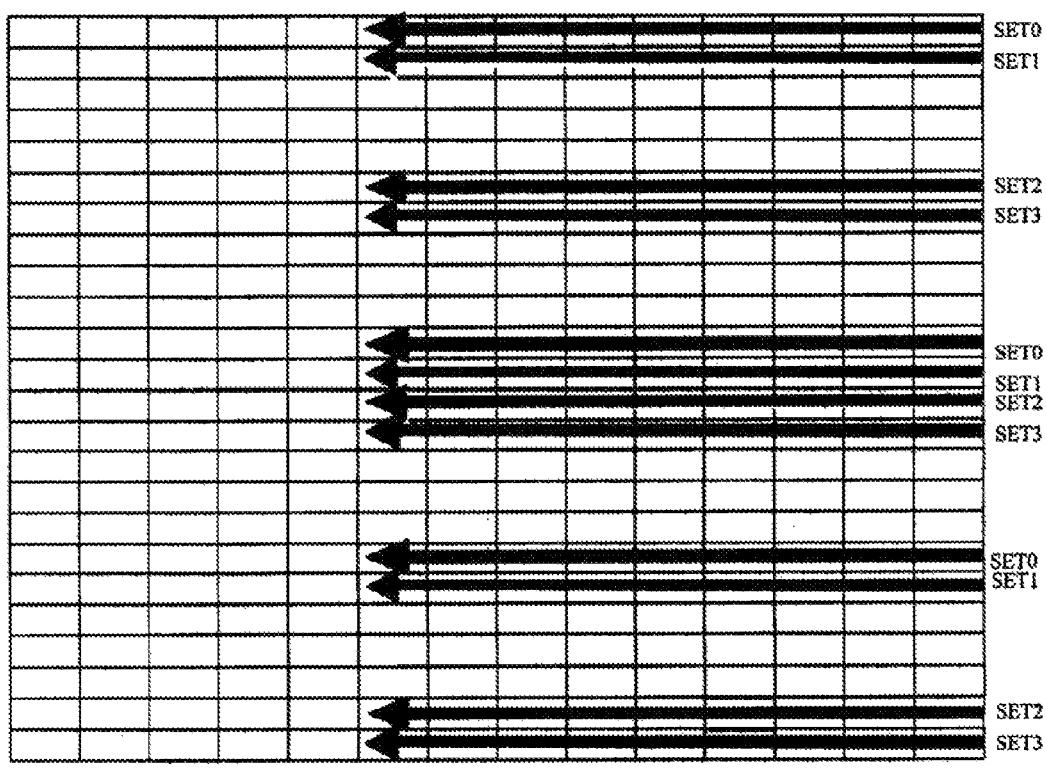
FIG. 6 is a schematic diagram of a sub-carrier based sequence mapping scheme at the rank 5-rank 8 according to an embodiment of the invention.

FIG. 6 is a schematic diagram of a sub-carrier based sequence mapping scheme at the rank 5-rank8. In this embodiment, similar or consistent power of respective pilot symbols can be ensured per sub-carrier. In a recommended design, a cyclic shift relationship is satisfied between sets of orthogonal sequences configured respectively for groups of ports mapped into different resources, and sets of orthogonal sequences of adjacent sub-carriers in the same group of ports, for transmission of dedicated pilots are arranged in a reverse order to each other, as depicted in Table 1 below:

TABLE 1

|  | Set 0 | Set 1 | Set 2 | Set 3 |
| --- | --- | --- | --- | --- |
| Code 1 | [1 1 1 1] | [1 1 1 1] | [1 1 1 1] | [1 1 1 1] |
| Code 2 | [1 −1 1 −1] | [1 −1 1 −1] | [−1 1 −1 1] | [−1 1 −1 1] |
| Code 3 | [1 1 −1 −1] | [−1 −1 1 1] | [−1 −1 1 1] | [1 1 −1 −1] |
| Code 4 | [1 −1 −1 1] | [−1 1 1 −1] | [1 −1 −1 1] | [−1 1 1 −1] |

For backward compatibility, that is, full consistency of a sequence mapping solution for streams 1 to 4 at the rank 8 with that at the rank 4, the mapping scheme of FIG. 6 is recommended.

Figure 7:
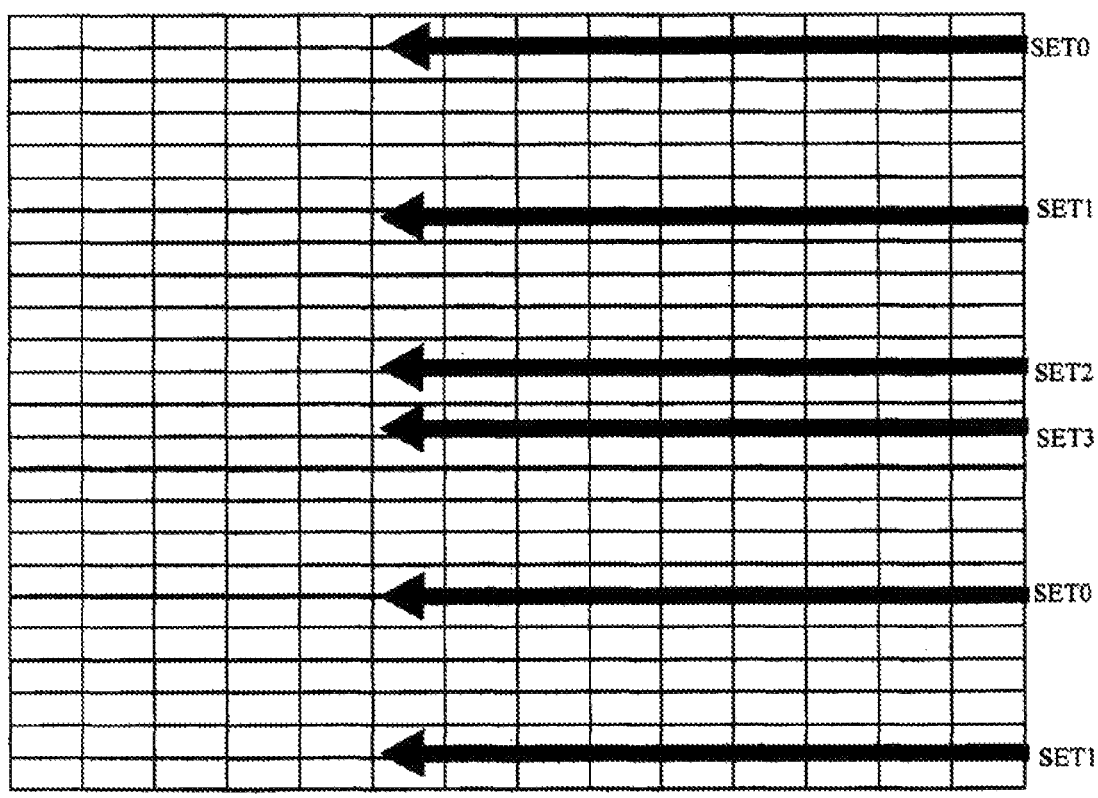
FIG. 7 is a schematic diagram of a sub-carrier group based sequence mapping scheme at the rank 5-rank 8 according to an embodiment of the invention.

FIG. 7 is a schematic diagram of a sub-carrier group based sequence mapping scheme at the rank 5-rank8. As illustrated in FIG. 7, similar or consistent power of respective pilot symbols can be ensured per sub-carrier group for sequences depicted in Table 2 below. In a recommended design, a set of sequences is shifted cyclically to further create a new set of sequences, as depicted in Table 1 below:

TABLE 2

|  | Set 0 | Set 1 | Set 2 | Set 3 |
| --- | --- | --- | --- | --- |
| Code 1 | [1 1 1 1] | [1 1 1 1] | [1 1 1 1] | [1 1 1 1] |
| Code 2 | [1 −1 1 −1] | [−1 1 −1 1] | [−1 1 −1 1] | [1 −1 1 −1] |
| Code 3 | [1 −1 −1 1] | [−1 −1 1 1] | [1 1 −1 −1] | [−1 1 1 −1] |
| Code 4 | [1 1 −1 −1] | [1 −1 −1 1] | [−1 1 1 −1] | [−1 −1 1 1] |

In the embodiments of the invention, a power balance can be ensured, orthogonality in the time and frequency domains can be ensured and backward compatibility can be ensured for a design of orthogonal sequences at the rank3-rank8. Furthermore a sequence mapping solution for streams 1 to 4 at the rank 8 can made consist completely with that at the rank 4. Therefore both backward compatibility and orthogonality in the time and frequency domains can be ensured in the embodiments of the invention.

Evidently those skilled in the art can make various modifications and variations to the invention without departing from the spirit and the scope of the invention. Thus the invention is also intended to encompass these modifications and variations thereto as long as these modifications and variations come into the scope of the claims appended to the invention and their equivalents.

The invention claimed is:

1. A method for transmitting a dedicated pilot, comprising the steps of:
   configuring a dedicated pilot with an orthogonal sequence over a resource for transmission of the dedicated pilot according to a preset mapping rule; and
   transmitting the dedicated pilot in a Code Division Multiplexing, CDM, mode or in a hybrid CDM and Frequency Division Multiplexing, FDM, mode,
   wherein adjacent sub-carriers, corresponding to the same port, for transmission of the dedicated pilot have their orthogonal sequences selected from different sets of orthogonal sequences;
   for a system at a transmission rank of 1 to 4, two adjacent sub-carriers, corresponding to the same port, for transmission of the dedicated pilot have their orthogonal sequences selected from different sets of orthogonal sequences; for a system at a transmission rank of 5 to 8, two adjacent sub-carriers, corresponding to the same port, for transmission of the dedicated pilot have their orthogonal sequences selected from different sets of orthogonal sequences;

wherein for a system at the transmission rank of 1 to 4, two adjacent sub-carriers, corresponding to the same port, for transmission of the dedicated pilot have their orthogonal sequences selected from different sets of orthogonal sequences in a frequency order within a system bandwidth; for a system at the transmission rank of 5 to 8, two adjacent sub-carriers, corresponding to the same port, for transmission of the dedicated pilot have their orthogonal sequences selected from different sets of orthogonal sequences in a frequency order within a system bandwidth.

2. The method according to claim 1, wherein for a system at a transmission rank of 5 to 8, an orthogonal sequence and a mapping rule adopted for a third stream to be transmitted are the same as those at a transmission rank of 3 or 4, and an orthogonal sequence and a mapping rule adopted for a fourth stream to be transmitted are the same as those at a transmission rank of 4.

3. The method according to claim 1, wherein the groups of ports mapped into the different resources are configured respectively with different sets of orthogonal sequences between which a cyclic shift relationship is satisfied, and the value of the cyclic shift is 2.

4. The method according to claim 1, wherein the different sets of orthogonal sequences are arranged in a reverse order to each other.

5. The method according to claim 1, wherein the number of sets of orthogonal sequences which the dedicated pilots mapped onto the same resource are configured with is consistent with the code length of an orthogonal code used for the dedicated pilot.

6. A device for transmitting a dedicated pilot, comprising:
a configuring unit configured to configure a dedicated pilot with an orthogonal sequence over a resource for transmission of the dedicated pilot according to a preset mapping rule; and
a transmitting unit configured to transmit the dedicated pilot processed by the configuring unit in a Code Division Multiplexing, CDM, mode or in a hybrid CDM and Frequency Division Multiplexing, FDM, mode;
wherein adjacent sub-carriers, corresponding to the same port, for transmission of the dedicated pilot have their orthogonal sequences selected from different sets of orthogonal sequences
wherein for a system at a transmission rank of 1 to 4, two adjacent sub-carriers, corresponding to the same port, for transmission of the dedicated pilot have their orthogonal sequences selected from different sets of orthogonal sequences; for a system at a transmission rank of 5 to 8, two adjacent sub-carriers, corresponding to the same port, for transmission of the dedicated pilot have their orthogonal sequences selected from different sets of orthogonal sequences;

wherein for a system at the transmission rank of 1 to 4, two adjacent sub-carriers, corresponding to the same port, for transmission of the dedicated pilot have their orthogonal sequences selected from different sets of orthogonal sequences in a frequency order within a system bandwidth; for a system at the transmission rank of 5 to 8, two adjacent sub-carriers, corresponding to the same port, for transmission of the dedicated pilot have their orthogonal sequences selected from different sets of orthogonal sequences in a frequency order within a system bandwidth.

7. The device according to claim 6, wherein for a system at a transmission rank of 5 to 8, an orthogonal sequence and a mapping rule adopted for a third stream are the same as those at a transmission rank of 3 or 4, and an orthogonal sequence and a mapping rule adopted for a fourth stream are the same as those at a transmission rank of 4.

8. The device according to claim 6, wherein the groups of ports mapped into the different resources are configured respectively with sets of orthogonal sequences between which a cyclic shift relationship is satisfied, and the value of the cyclic shift is 2.

9. The device according to claim 6, wherein the different sets of orthogonal sequences are arranged in a reverse order to each other.

10. The device according to claim 6, wherein the number of sets of orthogonal sequences which the dedicated pilots mapped onto the same resource are configured with is consistent with the code length of an orthogonal code used for the dedicated pilot.

11. The method according to claim 1, wherein groups of ports mapped into different resources are configured respectively with different sets of orthogonal sequences.

12. The device according to claim 6, wherein groups of ports mapped into different resources are configured respectively with different sets of orthogonal sequences.

13. The method according to claim 1, wherein for a system at a transmission rank of 3 to 8, an orthogonal sequence and a mapping rule adopted for a first stream to be transmitted are the same as those at a transmission rank of 1 or 2, and an orthogonal sequence and a mapping rule adopted for a second stream to be transmitted are the same as those at a transmission rank of 2.

14. The device according to claim 6, wherein for a system at a transmission rank of 3 to 8, an orthogonal sequence and a mapping rule adopted for a first stream are the same as those at a transmission rank of 1 or 2, and an orthogonal sequence and a mapping rule adopted for a second stream are the same as those at a transmission rank of 2.

* * * * *